US010520631B2

United States Patent
Eick et al.

(10) Patent No.: US 10,520,631 B2
(45) Date of Patent: Dec. 31, 2019

(54) MAGNETIC FIELD MEASUREMENT VIA STREAMER CABLES

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 960 days.

(21) Appl. No.: 14/709,838

(22) Filed: May 12, 2015

(65) Prior Publication Data
US 2015/0355362 A1 Dec. 10, 2015

Related U.S. Application Data

(60) Provisional application No. 62/008,292, filed on Jun. 5, 2014.

(51) Int. Cl.
| | |
|---|---|
| *G01V 3/08* | (2006.01) |
| *G01V 3/38* | (2006.01) |
| *G01S 19/14* | (2010.01) |
| *G01V 1/38* | (2006.01) |
| *G01V 3/15* | (2006.01) |
| *G01S 19/13* | (2010.01) |

(52) U.S. Cl.
CPC ............. *G01V 3/15* (2013.01); *G01S 19/13* (2013.01); *G01V 3/38* (2013.01); *G01V 3/081* (2013.01)

(58) Field of Classification Search
CPC .......... G01V 3/15; G01V 1/3835; G01V 3/38; G01V 3/081; G01S 19/14; G01S 19/13
See application file for complete search history.

(56) References Cited

U.S. PATENT DOCUMENTS

| 4,570,122 | A | * | 2/1986 | Leu | G01V 3/087 324/331 |
|---|---|---|---|---|---|
| 8,054,070 | B1 | * | 11/2011 | Lanzagorta-Saldana | G01R 33/10 324/244 |
| 2005/0180263 | A1 | | 8/2005 | Lambert et al. | |
| 2011/0158043 | A1 | * | 6/2011 | Johnstad | G01V 1/201 367/16 |
| 2011/0279120 | A1 | | 11/2011 | Sudow et al. | |
| 2011/0286301 | A1 | * | 11/2011 | Seale | G01V 1/3817 367/16 |

OTHER PUBLICATIONS

International Search Report and Written Opinion of PCT/US2015/030345, dated Aug. 12, 2015.

* cited by examiner

*Primary Examiner* — Alexander Satanovsky
*Assistant Examiner* — Mark I Crohn
(74) *Attorney, Agent, or Firm* — Conocophillips Company

(57) ABSTRACT

A method of generating a magnetic anomaly map and a system to develop a magnetic anomaly map are described. The method includes obtaining magnetic compass data recorded by two or more magnetic compasses disposed along a seismic streamer that traverses a first area and obtaining measurements from one or more navigation systems over the first area. The method also includes determining a correct position of each of the two or more magnetic compasses based on the measurements from the one or more navigation systems, and comparing the magnetic compass data with theoretical magnetic field data at the correct positions to generate a magnetic anomaly map.

16 Claims, 3 Drawing Sheets

MAGNETIC FIELD MEASUREMENT VIA STREAMER CABLES

CROSS-REFERENCE TO RELATED APPLICATIONS

This application is a non-provisional application which claims benefit under 35 USC § 119(e) to U.S. Provisional Application Ser. No. 61/008,292 filed Jun. 51, 2014, entitled "MAGNETIC FIELD MEASUREMENT VIA STREAMER CABLES."

FIELD OF THE INVENTION

This invention relates to seismic streamers towed by a vessel in a marine environment. In particular, embodiments detail identification of features and structures based on developing a magnetic anomaly map using data obtained at the seismic streamers.

BACKGROUND OF THE INVENTION

Seismic streamers are towed by a vessel in a marine environment such as an ocean. Each seismic streamer (cable) includes a series of the geophones or hydrophones (receivers) that receive seismic signals and convert them into electrical or other signals. The receivers arranged along the seismic streamers record seismic signals resulting from a reflection of a seismic source signal transmitted into the underwater environment below the seismic streamers. The seismic source signal may originate from the vessel, for example (e.g., based on gun array). The seismic streamers extend behind the vessel and can be several to tens of kilometers in length. Thus, the seismic streamers are unlikely to be linear but, instead, have shapes affected by factors like wind speed, direction, and marine current, for example. The seismic streamers are typically fashioned with the receivers arranged at regular intervals along each seismic streamer.

Seismic streamers also have acoustic pods that both send and receive coded pulses through the water. These coded pulses allow determination of the travel time between different acoustic pods and form a network of ranges. By using the acoustic pods with global positioning system (GPS) receivers on the front and tail end of the streamers and the gun array, the network of ranges from the acoustic pods can be solved to determine the location of the streamers under the water.

In addition to the receivers and the acoustic pods, each seismic streamer also includes one or more magnetic compasses arranged along its length. Each magnetic compass measures the direction of the earth's magnetic field at specified time intervals. This information, along with the knowledge of the location of each magnetic compass along the respective seismic streamer and information from the receivers, facilitates estimation of the graphic shape of each streamer over time. This graphic shape in turn can be used to determine the location of each receiver relative to the vessel as a check of the acoustic ranges or as a replacement for acoustic ranges depending on the level of confidence for the different information provided.

SUMMARY OF THE INVENTION

According to an embodiment, a method of generating a magnetic anomaly map includes obtaining magnetic compass data recorded by two or more magnetic compasses disposed along a seismic streamer that traverses a first area; obtaining measurements from one or more navigation systems over the first area; determining a correct position of each of the two or more magnetic compasses based on the measurements from the one or more navigation systems; and comparing the magnetic compass data with theoretical magnetic field data at the correct positions to generate a magnetic anomaly map.

According to another embodiment, a system to generate a magnetic anomaly map includes two or more magnetic compasses disposed along a seismic streamer that traverses a first area, the two or more magnetic compasses configured to obtain magnetic compass data; one or more navigation systems configured to obtain measurements over the first area; and a processor configured to determine a correct position of each of the two or more magnetic compasses based on the measurements from the one or more navigation systems and compare the magnetic compass data with theoretical magnetic field data at the correct positions to generate a magnetic anomaly map.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

As noted above, seismic streamers with receivers arranged along the length of the seismic streamer (cable) can record seismic reflections produced based on a seismic source. Location determination for the seismic cable includes the use of acoustic pods and GPS units mounted on the floats for the streamer, gun arrays and tail buoys. Employing magnetic compasses in addition to the acoustic pods and GPS units facilitates determining the location of each receiver relative to the vessel. This, in turn, facilitates a mapping of the seismic signals received at the receivers with positions on a marine chart. However, in certain areas, the magnetic compasses may encounter a magnetic anomaly (a local variation in the earth's magnetic field or an anomaly in the earth's field). Prior systems have focused on correcting the magnetic compass measurements affected by the anomalies. Embodiments of the systems and methods described herein relate to correlating the magnetic compass data with additional positioning data from navigation systems (e.g., GPS unit, gyroscope, acoustic pods) to generate a magnetic anomaly map. That is, a theoretically correct magnetic field at each position may be used to identify and quantify anomalies. Based on mapping the magnetic anomalies, the location of features and structures causing the anomalies (e.g., sunken ship, salt pocket, volcano, volcanic activity) can be identified.

Figure 1:
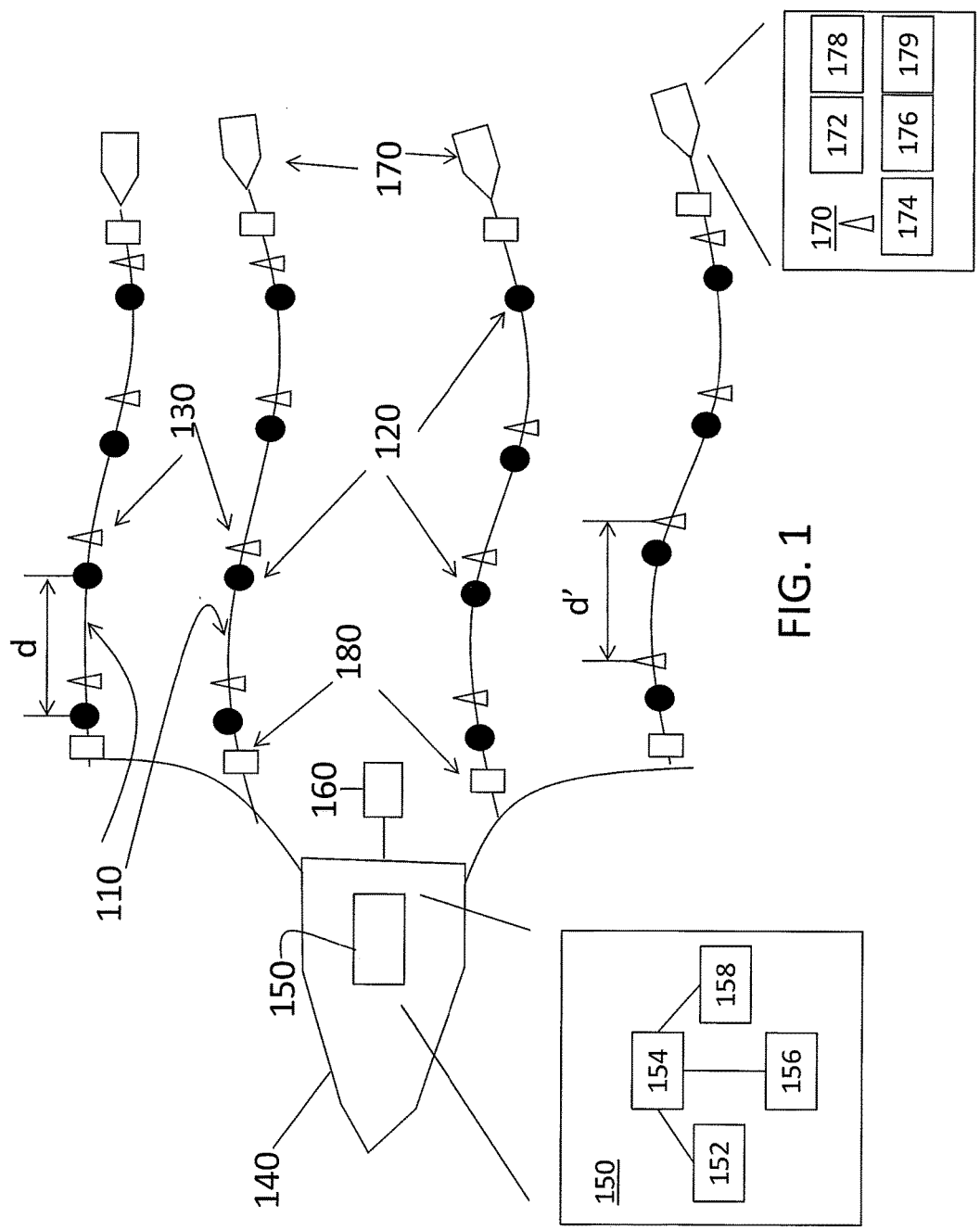
FIG. 1 is a simplified overhead view of a vessel towing a plurality of seismic streamers according to an embodiment of the invention.

FIG. 1 is a simplified overhead view of a vessel 140 towing a plurality of seismic streamers 110 according to an embodiment of the invention. The illustration in FIG. 1 is for explanatory purposes regarding the components and is not to scale. The streamers 110 (cables) include a plurality of receivers 120 (e.g., hydrophones) that receive seismic reflections resulting from one or more seismic sources 160 (e.g., gun array). Although four streamers 110 are shown in FIG. 1, one or many streamers 110 may be towed behind the vessel 140. A diverter, for example, may be used to separate the streamers 110 and spread them out behind the vessel 140. One or more magnetic compasses 130 may also be arranged along each seismic streamer 110. The relative arrangement of the receivers 120 and magnetic compasses 130 is not limited to the exemplary arrangement shown in FIG. 1. The vessel 140 carries one or more controllers 150 to control and analyze data from the one or more sources 160 and sensors (e.g., receivers 120, magnetic compasses 130). The controller 150 includes an input interface 152, one or more processors 154, one or more memory devices 156, and an output interface 158. Acoustic pods 180 that send and receive coded messages among themselves to determine positioning via travel time of the message may be arranged on either end of the streamers 110. A buoy 170 may be arranged at the opposite end of each streamer 110 from the vessel 140 and may carry additional equipment such as a global positioning system (GPS) receiver 172, a gyroscope 174, an accelerometer 176, an acoustic network 178, and a processor 179, for example. In alternate embodiments, the GPS receiver 172 (and one or more of the other sensors) may be on the vessel 140 rather than on each buoy 170 or GPS receivers 172 may be positioned on the streamers 110 along with the pods 180. The buoy 170 may include a magnetic compass 130, as well.

The magnetic compasses 130 arranged along the seismic streamers 110 may be arranged uniformly, at a distance d' of every 300 meters (m), for example. The magnetic compass 130 data may be sampled at a specified interval (e.g., every 8 seconds) and may have overlaps from sequence to sequence of sampling in the three dimensions (3D) of 50 percent (%) or more. Based on the overlap and sampling, diurnal effects and sampling effects may be removed and compensated for using known magnetics techniques. As an example, 400 magnetic compass measurements covering an area of 1 kilometer (km) by 8.1 km may be obtained from a typical marine configuration. Based on the overlap of at least 50%, diurnal variations may be removed and the actual magnetic tool field data for the region may be obtained. As detailed below, this field data may be compared with data regarding the location of the magnetic compasses 130 obtained using other sensors to develop the magnetic anomaly map (see e.g., 310, FIG. 3).

Figure 2:
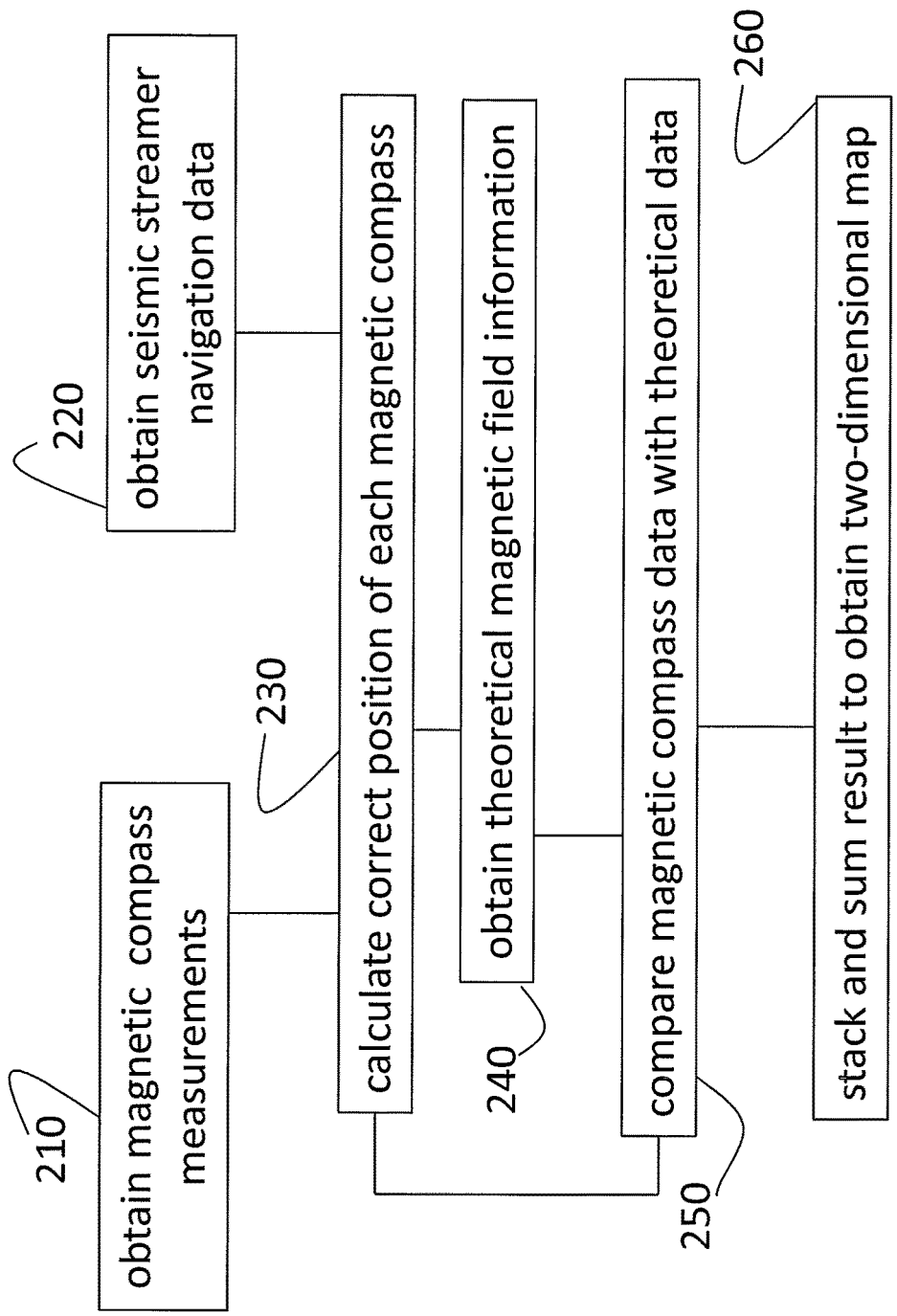
FIG. 2 is a process flow diagram of a method of generating a magnetic anomaly map according to embodiments of the invention.

FIG. 2 is a process flow diagram of a method of generating a magnetic anomaly map (300, FIG. 3) according to embodiments of the invention. At block 210, obtaining magnetic compass 130 measurements includes arranging magnetic compasses 130 along each seismic streamer 110 and recording samples at defined intervals. The defined interval (e.g., every 3 seconds, every 5 seconds) may be based on a speed of the vessel 140 (e.g., 5 knots) towing the seismic streamers 110, for example. At block 220, obtaining seismic streamer 110 navigation data may include obtaining data from sensors such as the gyroscope 174, GPS receiver 172, acoustic pods 180, and acoustic network 178. At block 230, calculating the correct position of each magnetic compass 130 includes modeling the seismic streamer 110 shape as a cubic spline and using the gyroscope 174, GPS receiver 172, acoustic pods 180 and acoustic network 178 data to determine the location of each magnetic compass 130 on each seismic streamer 110. Known seismic survey navigation packages that do not use data from the magnetic compass 130 itself to determine position may be used. At block 240, obtaining theoretical magnetic field information refers to obtaining the magnetic field data for the locations corresponding with locations for which magnetic compass 130 data is obtained. At block 250, comparing the magnetic compass 130 data with the theoretical magnetic field data (obtained at block 240) includes creating a magnetic declination and inclination (magnetic anomaly) map. At block 260, stacking and summing the comparisons over the sampling cycles results in the final two-dimensional (2D) magnetic anomaly map (see e.g., 300, FIG. 3) for the area sampled by the magnetic compasses 130. This process may improve the precision and accuracy of the magnetic compass 130 data. Specifically at block 260, the magnetic declination or inclination at the same position over a number of samples of the magnetic compasses 130 are stacked and summed creating a fold of stack magnetic map. When the magnetic compass 130 data and seismic streamer 110 navigation data are available, calculating the correct position of the magnetic compasses 130 (230) and comparing the magnetic compass 130 data with the theoretical data (250) to generate the magnetic anomaly map (300, FIG. 3) can be done either in real-time or in post-processing based on recorded data. The calculating (230), comparing (250), and obtaining the final 2D magnetic anomaly map (260) may be done by the processor 179 associated with each seismic streamer 110, by the processor 154 on the vessel 140, or a different computer processing system with access to real-time or recorded data. The processor (179, 154, or other) would access instructions and data from one or more memory devices (e.g., 156).

Figure 3:
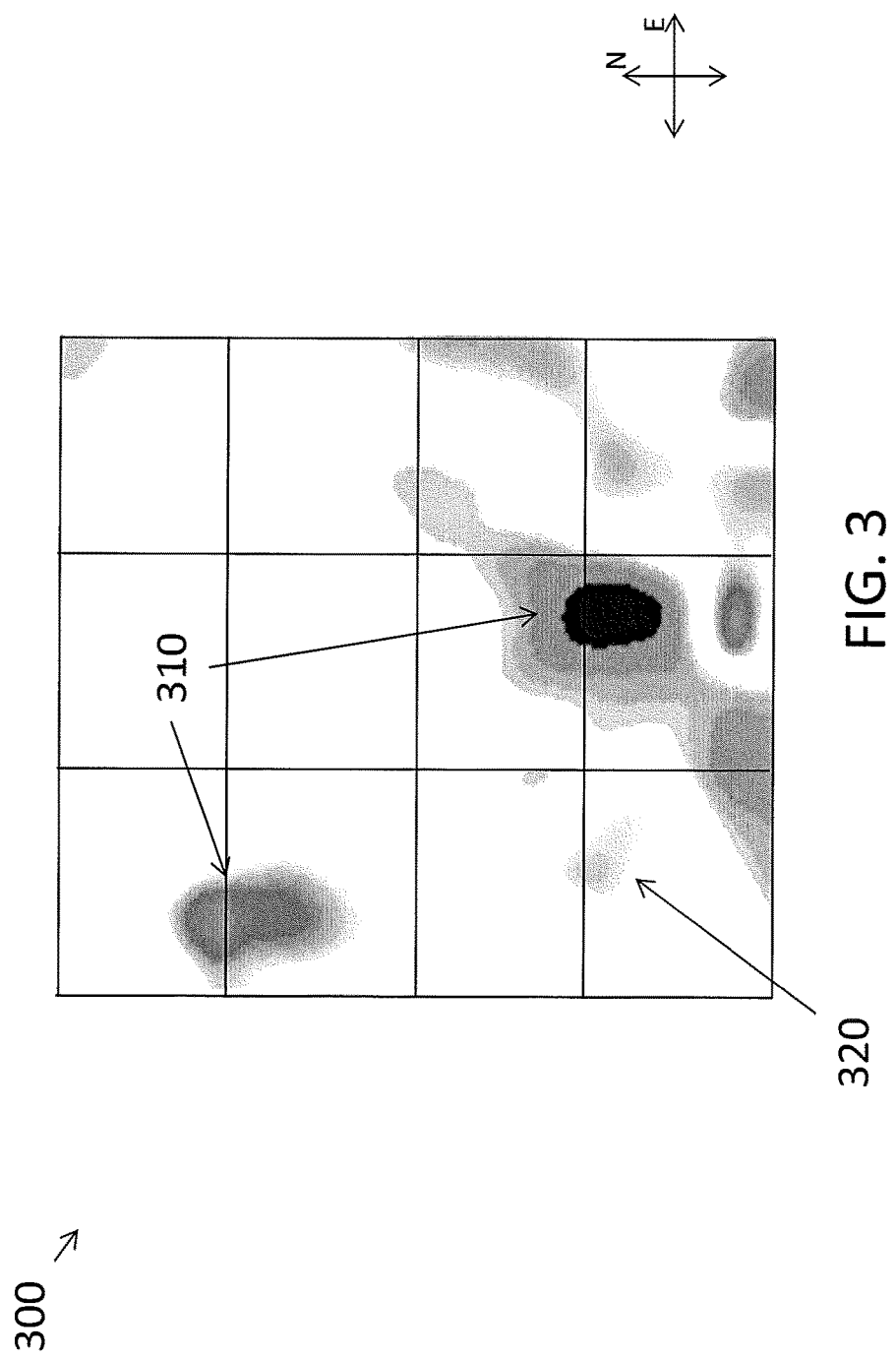
FIG. 3 is an exemplary magnetic anomaly map generated according to embodiments of the invention.

FIG. 3 is an exemplary magnetic anomaly map 300 generated according to embodiments of the invention. The magnetic anomaly map 300 may present data with color coding, for example. Thus, for example, areas with magnetic declination 310 may be shaded differently than areas with magnetic inclination 320. The magnetic anomaly information may be used to identify subsurface features such as a sunken ship, salt pocket, volcano, or volcanic activity. This information may be output as a display, for example, or may be processed further or correlated, with seismic samples, for example, to provide additional information regarding the area in which the magnetic compass 130 samples were obtained. As noted above, by generating the magnetic anomaly map (rather than simply correcting for anomalies, for example), an additional benefit of identifying structures and features responsible for the anomalies may be achieved.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method of generating a magnetic anomaly map, the method comprising:
towing a seismic streamer behind a vessel so the seismic streamer traverses a first area behind the vessel;
recording magnetic compass data measured by two or more magnetic compasses disposed along the seismic streamer while the vessel tows the seismic streamer at a speed;
obtaining measurements from one or more navigation systems over the first area;
determining a correct position of each of the two or more magnetic compasses based on the measurements from the one or more navigation systems;
comparing the magnetic compass data with theoretical magnetic field data at the correct position of each of the two or more magnetic compasses to yield a magnetic declination and inclination map;
processing the magnetic declination and inclination map using overlap data and/or sampling data to improve the magnetic declination and inclination map, the processing including removal and compensation of any diurnal variations and removal of any sampling effects;
generating a magnetic anomaly map based on the processing of the magnetic declination and inclination map; and
displaying the magnetic anomaly map.

2. The method according to claim 1, wherein the obtaining the measurements from the one or more navigation systems includes obtaining measurements from a global positioning system (GPS) receiver, acoustic pods, or a gyroscope.

3. The method according to claim 1, wherein the determining the correct position includes developing a model of a shape of the seismic streamer.

4. The method according to claim 3, wherein the determining the correct position additionally includes modeling the shape of the seismic streamer as a cubic spline and using the measurements from the one or more navigation systems with the model to determine a location of each of the two or more magnetic compasses arranged on the seismic streamer.

5. The method according to claim 1, wherein generating the magnetic anomaly map includes indicating magnetic inclination and magnetic declination within the first area.

6. The method according to claim 1, further comprising:
repeating the obtaining the magnetic compass data periodically over a specified duration to collect a series of samples.

7. The method according to claim 6, further comprising:
performing the comparing for each series of the samples to obtain the magnetic anomaly map for each series of the samples.

8. The method according to claim 7, further comprising:
developing a final two-dimensional magnetic anomaly map based on stacking each of the magnetic anomaly maps for each series of the samples and adding a result of the comparing for each series of the samples at each respective location.

9. A system to generate a magnetic anomaly map, the system comprising:
a seismic streamer configured to be towed behind a vessel;
two or more magnetic compasses disposed along the seismic streamer and configured to traverse a first area behind the vessel, the two or more magnetic compasses configured to obtain magnetic compass data while the vessel tows the seismic streamer at a speed;
one or more navigation systems configured to obtain measurements over the first area; and
a processor configured to:
determine a correct position of each of the two or more magnetic compasses based on the measurements from the one or more navigation systems,
compare the magnetic compass data with theoretical magnetic field data at the correct position of each of the two or more magnetic compasses to yield a magnetic declination and inclination map,
process the magnetic declination and inclination map using overlap data and/or sampling data to improve the magnetic declination and inclination map,
generate a magnetic anomaly map based on processing of the magnetic declination and inclination map, the processing of the magnetic declination and inclination map including removal and compensation of any account for diurnal variations, and
display the magnetic anomaly map.

10. The system according to claim 9, wherein the one or more navigation systems is a global positioning system (GPS) receiver, acoustic pods, or a gyroscope.

11. The system according to claim 9, wherein the processor determines the correct position based on a model of a shape of the seismic streamer.

12. The system according to claim 11, wherein the processor determines the correct position by modeling the shape of the seismic streamer as a cubic spline and using the measurements from the one or more navigation systems with the model to determine a location of each of the two or more magnetic compasses arranged on the seismic streamer.

13. The system according to claim 9, wherein the magnetic anomaly map indicates magnetic inclination and magnetic declination within the first area.

14. The system according to claim 9, wherein the two or more magnetic compasses obtain the magnetic compass data periodically over a specified duration to collect a series of samples.

15. The system according to claim 14, wherein the processor compares the magnetic compass data with the correct position of each of the two or more magnetic compasses for each series of the samples and generates the magnetic anomaly map for each series of the samples.

16. The system according to claim 15, wherein the processor develops a final two-dimensional magnetic anomaly map based on stacking each of the magnetic anomaly maps for each series of the samples and adding a result of comparing the magnetic compass data with the correct position of each of the two or more magnetic compasses for each series of the samples at each respective location.

\* \* \* \* \*